(12) United States Patent
Han et al.

(10) Patent No.: US 11,485,029 B2
(45) Date of Patent: Nov. 1, 2022

(54) WORKING ROBOT

(71) Applicant: INDUSTRY-UNIVERSITY COOPERATION FOUNDATION HANYANG UNIVERSITY ERICA CAMPUS, Ansan-si (KR)

(72) Inventors: Chang Soo Han, Seoul (KR); Yong Seok Lee, Ansan-si (KR); Sang Ho Kim, Ansan-si (KR); Dong Ik Sun, Ansan-si (KR); Sang Keun Lee, Ansan-si (KR); Jin Sung Park, Ansan-si (KR); Min Ji Kim, Goyang-si (KR)

(73) Assignee: INDUSTRY-UNIVERSITY COOPERATION FOUNDATION HANYANG UNIVERSITY ERICA CAMPUS, Ansan-si (KR)

( * ) Notice: Subject to any disclaimer, the term of this patent is extended or adjusted under 35 U.S.C. 154(b) by 367 days.

(21) Appl. No.: 16/728,385

(22) PCT Filed: Jun. 29, 2018

(86) PCT No.: PCT/KR2018/007450
§ 371 (c)(1),
(2) Date: Dec. 27, 2019

(87) PCT Pub. No.: WO2019/004798
PCT Pub. Date: Jan. 3, 2019

(65) Prior Publication Data
US 2020/0180168 A1   Jun. 11, 2020

(30) Foreign Application Priority Data

Jun. 29, 2017 (KR) .......................... 10-2017-0082716
Jun. 29, 2018 (KR) .......................... 10-2018-0076126

(51) Int. Cl.
*B25J 18/04* (2006.01)
*B25J 9/00* (2006.01)
(Continued)

(52) U.S. Cl.
CPC ............... *B25J 18/04* (2013.01); *B25J 5/007* (2013.01); *B25J 9/0009* (2013.01); *B25J 9/1628* (2013.01); *B25J 9/1694* (2013.01)

(58) Field of Classification Search
CPC ........ B25J 18/04; B25J 9/1628; B25J 9/1694; B25J 5/007; B25J 5/005
See application file for complete search history.

(56) References Cited

U.S. PATENT DOCUMENTS 4,558,758 A * 12/1985 Littman ................ B66F 11/046
182/2.11

FOREIGN PATENT DOCUMENTS

| CN | 107059979 A | 8/2017 |
| JP | 62-43370 A | 2/1987 |

(Continued)

OTHER PUBLICATIONS

Machine translation of KR-20110078313-A (Year: 2011).*

(Continued)

*Primary Examiner* — Randell J Krug
(74) *Attorney, Agent, or Firm* — Sughrue Mion, PLLC

(57) ABSTRACT

The present invention relates to a working robot. According to one embodiment of the present invention, the working robot comprises: a body; a plurality of traveling units connected to the body, having supporting members and traveling members rotatably connected to the supporting members, and provided so as to be travelable with respect to the ground; and a plurality of adjusting units connecting the body and the traveling units, and provided to enable the relative positions of the traveling units to the body to be (Continued)

adjusted, wherein the plurality of traveling units are traveled and the plurality of adjusting units are adjusted so as to maintain the horizontal state of the body.

13 Claims, 9 Drawing Sheets

(51) Int. Cl.
*B25J 9/16* (2006.01)
*B25J 5/00* (2006.01)

(56) References Cited

FOREIGN PATENT DOCUMENTS

| JP | 2012-086133 | A | | 5/2012 |
|----|-------------|---|---|--------|
| JP | 2014-161991 | A | | 9/2014 |
| KR | 10-2006-0034211 | A | | 4/2006 |
| KR | 10-2009-0002417 | A | | 1/2009 |
| KR | 10-2009-0085176 | A | | 8/2009 |
| KR | 10-2010-0127963 | A | | 12/2010 |
| KR | 10-2011-0078313 | A | | 7/2011 |
| KR | 20110078313 | A | * | 7/2011 |
| KR | 10-2016-0034454 | A | | 3/2016 |
| KR | 10-2016-0134999 | A | | 11/2016 |

OTHER PUBLICATIONS

Inverse Kinematics and Control of a 7-DOF Redundant Manipulator Based on the Closed-Loop Algorithm, Advanced Robotic Systems International, Wang et al. (Year: 2010).*

Wonsuk Lee et al., "A whole-body rescue motion control with task-priority strategy for a rescue robot", Auton Robot, 2017, pp. 243-258, vol. 41.

International Search Report for PCT/KR2018/007450 dated Sep. 12, 2018 [PCT/ISA/10].

* cited by examiner

[Fig. 1]
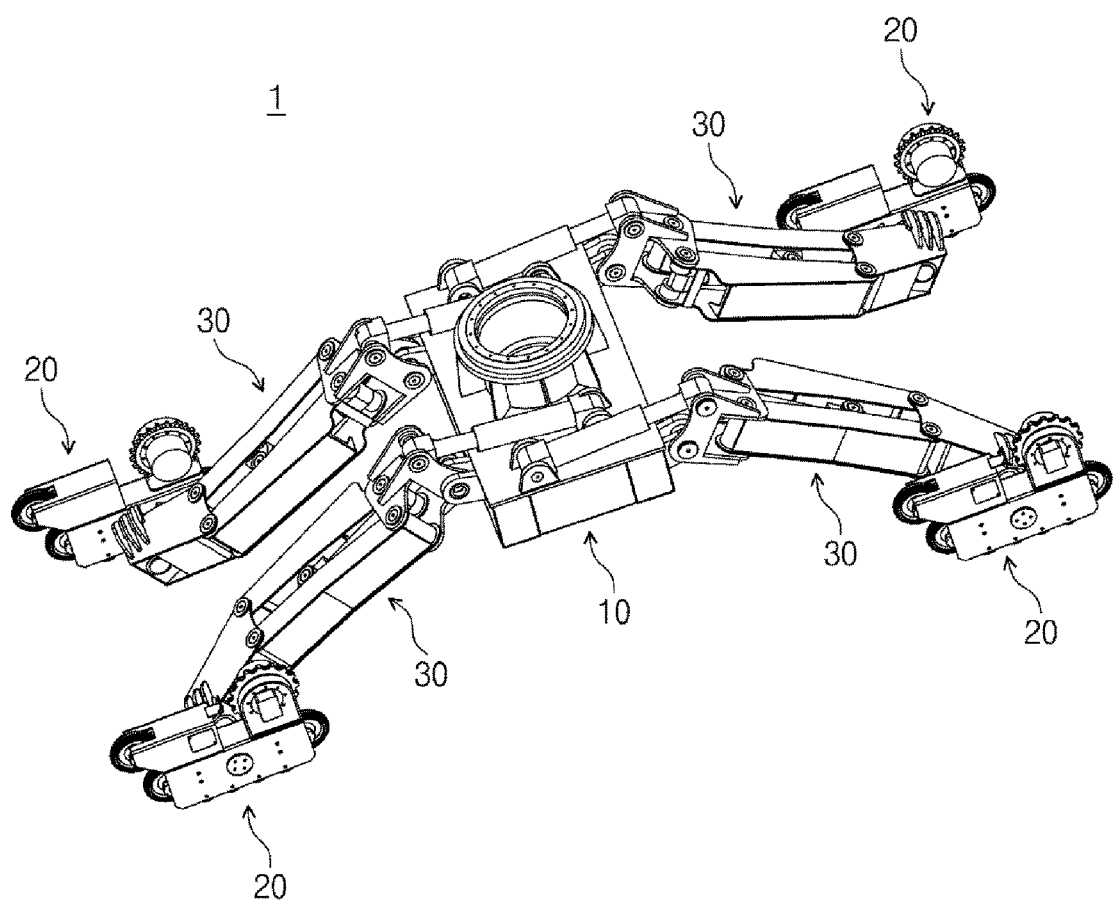

[Fig. 2]
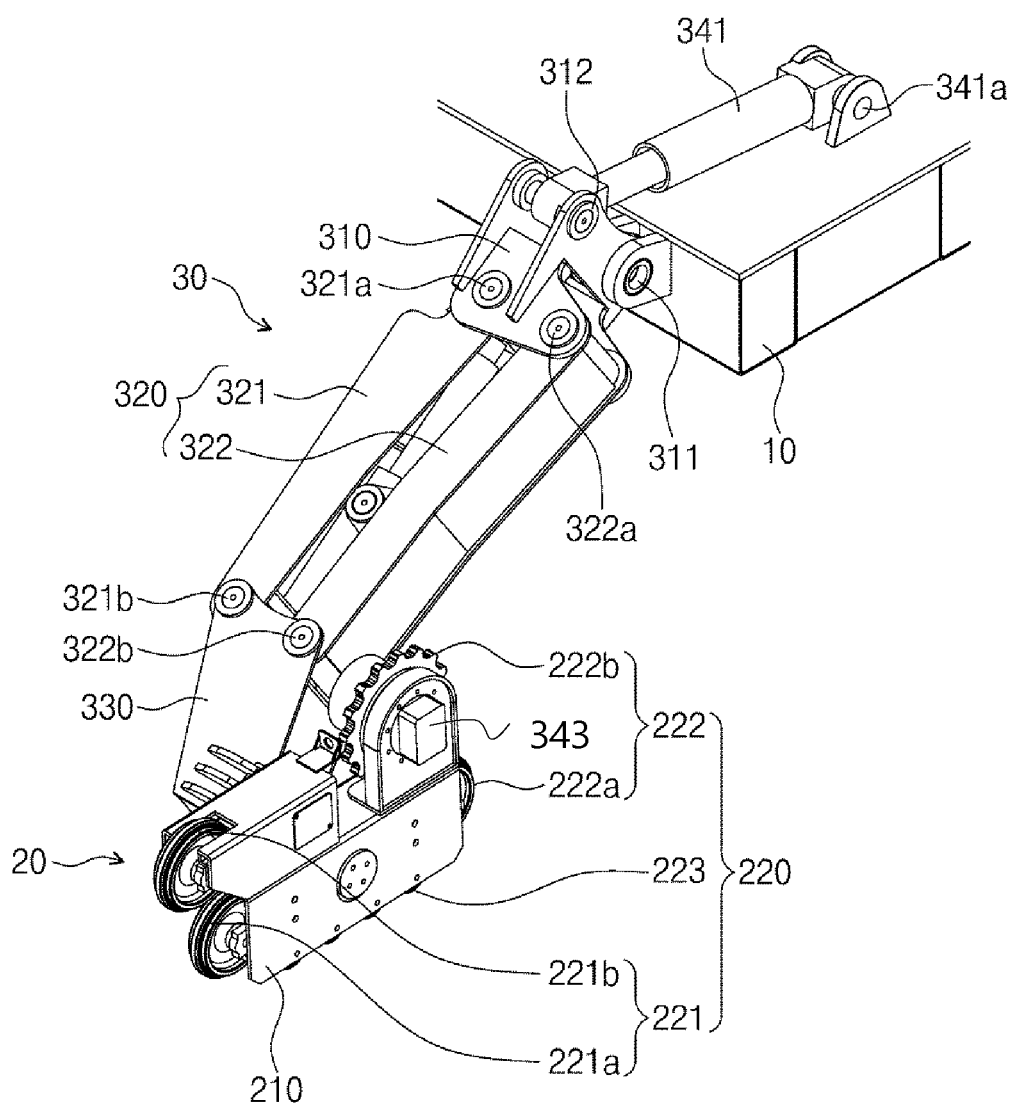

[Fig. 3]
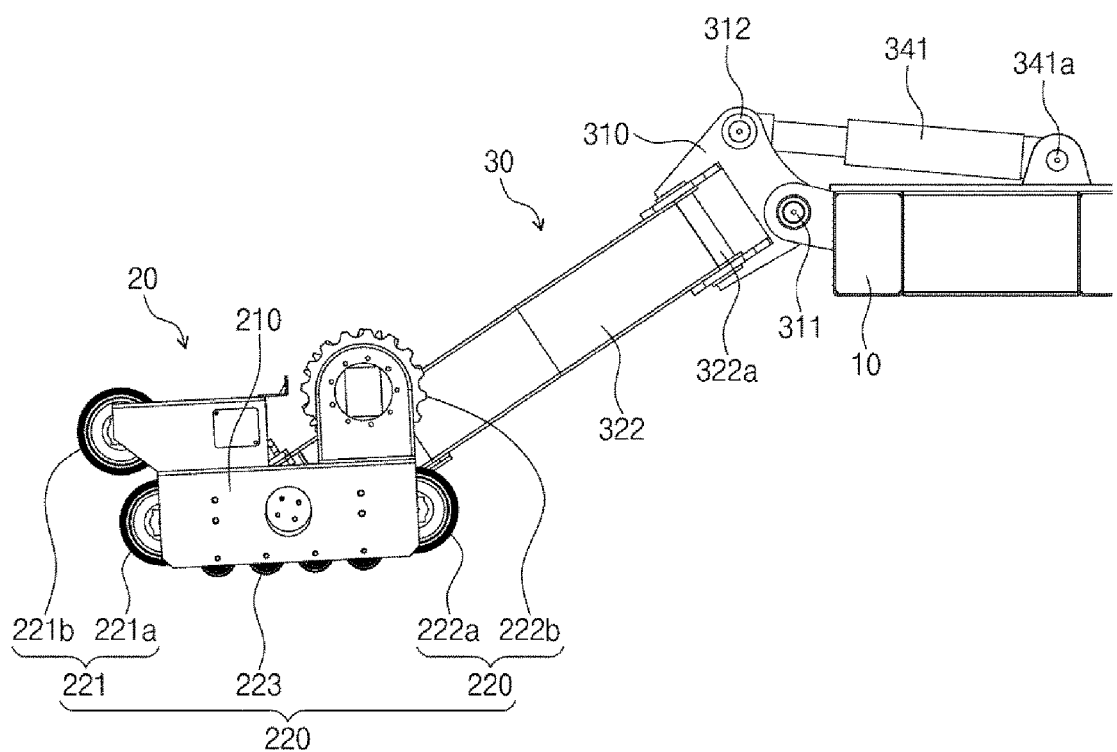

[Fig. 4]
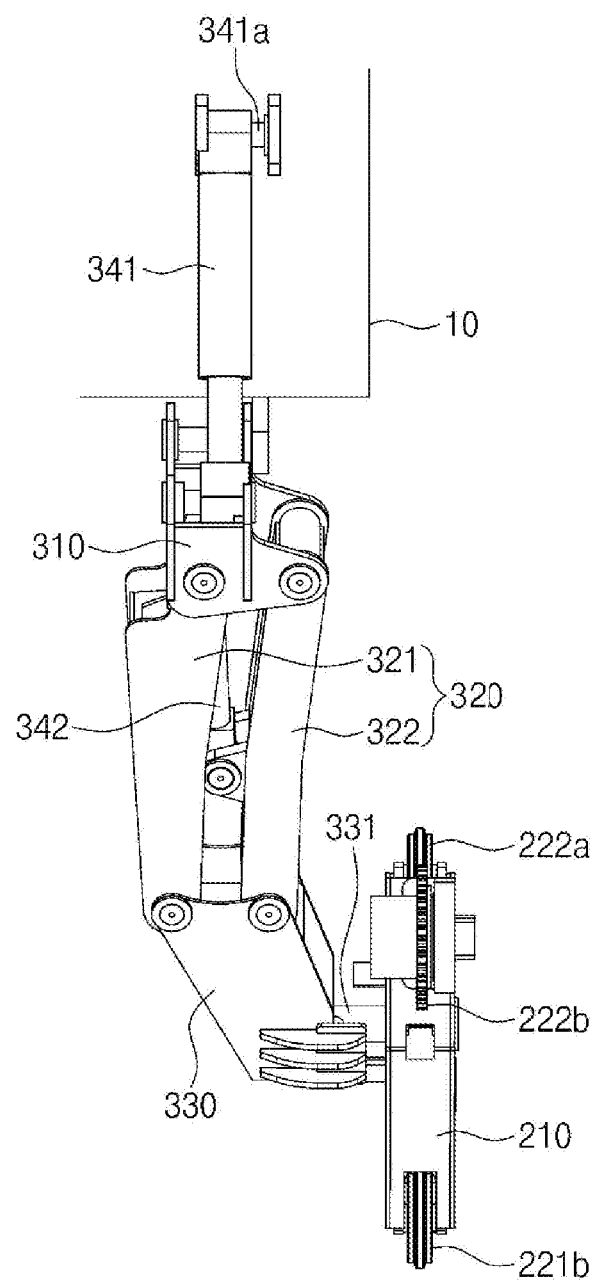

[Fig. 5]
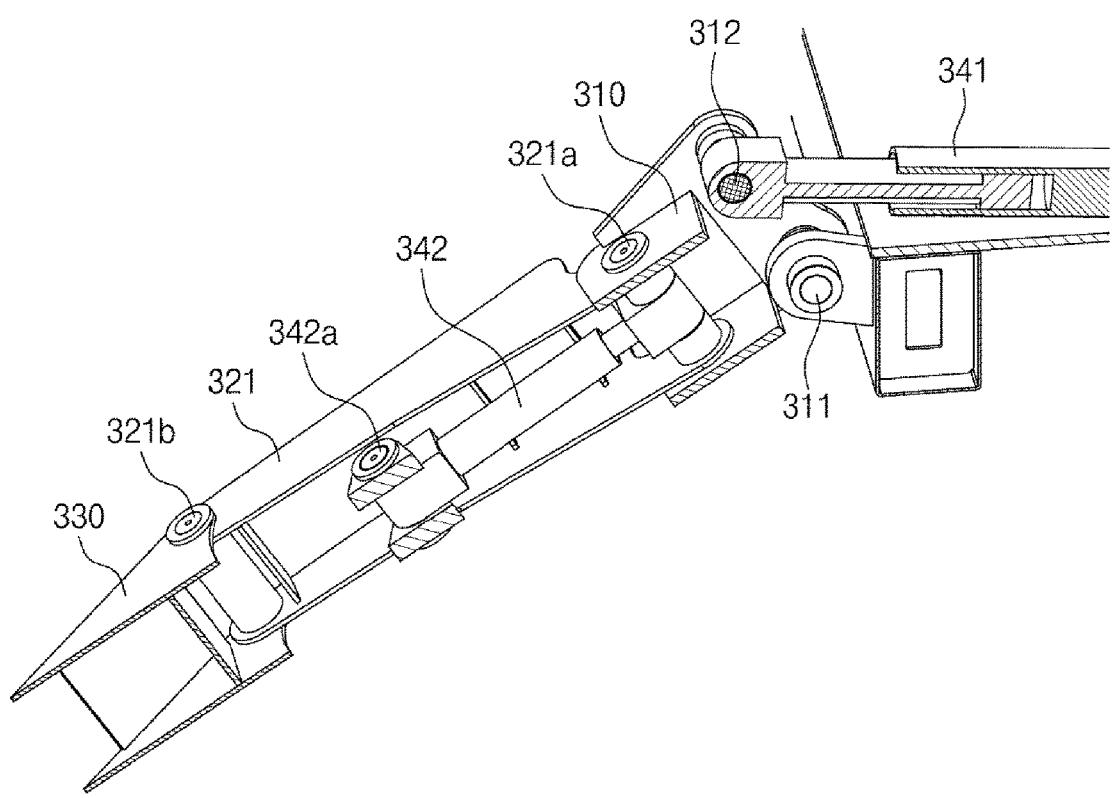

[Fig. 6]
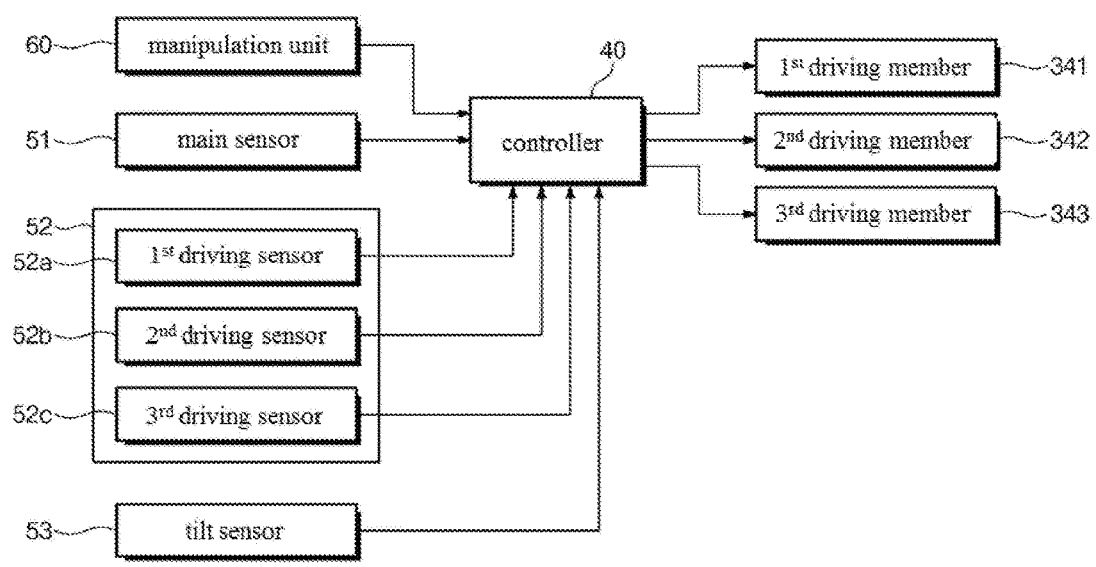

[Fig. 7]
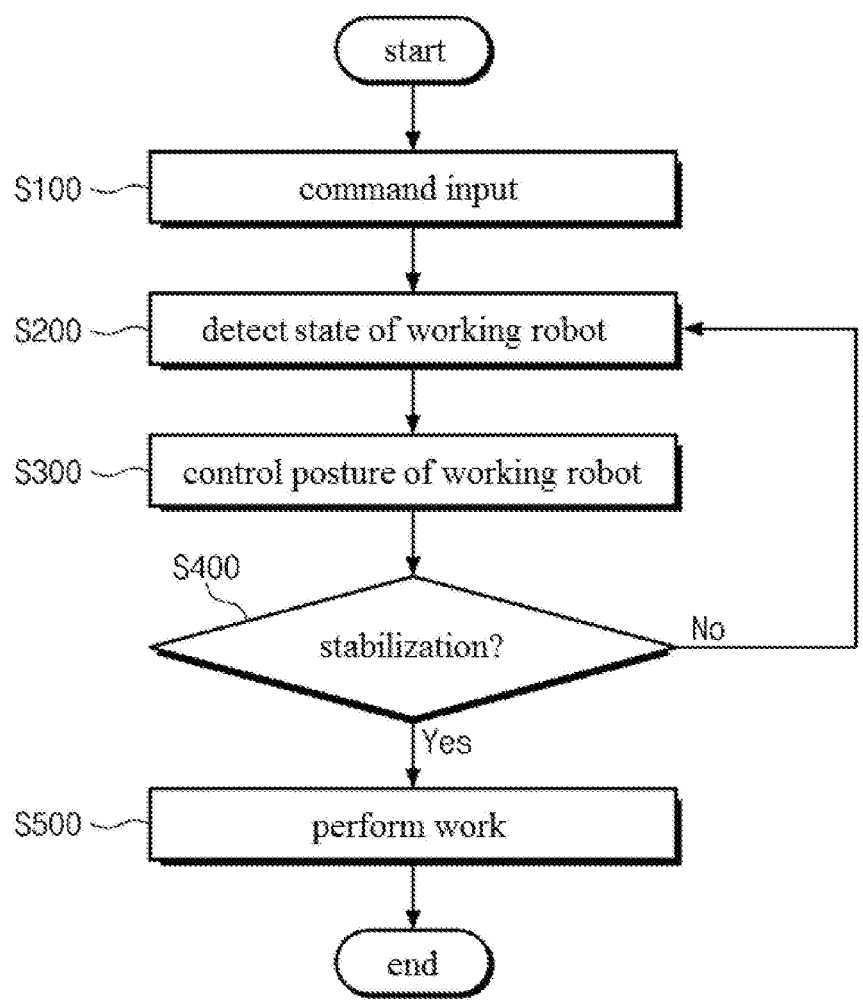

[Fig. 8]
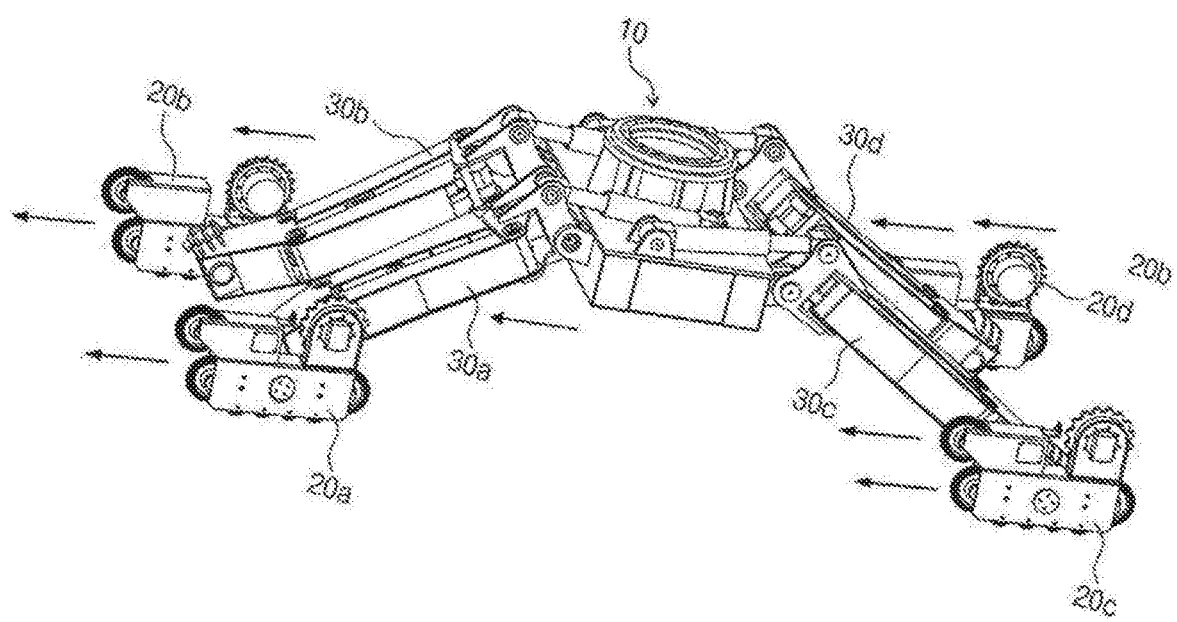

[Fig. 9]
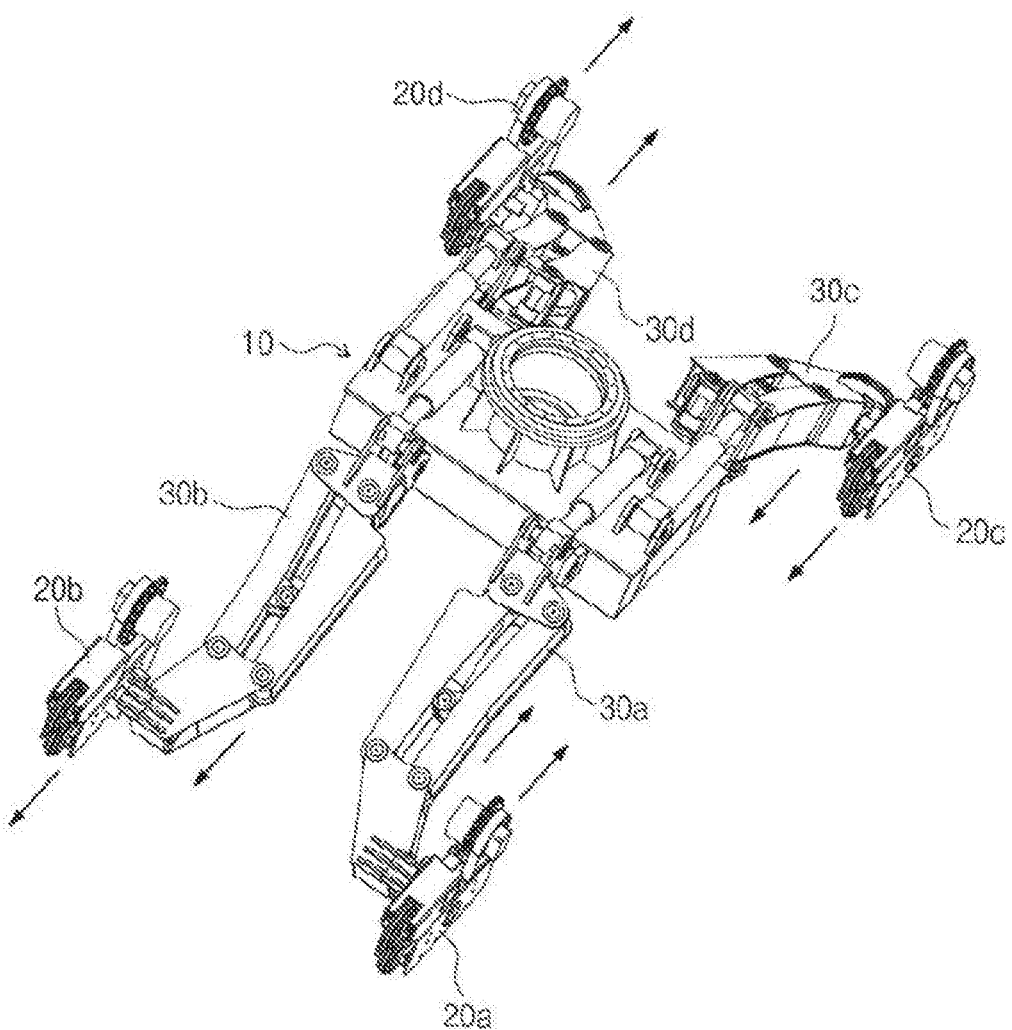

WORKING ROBOT

TECHNICAL FIELD

The present invention relates to a working robot, and more particularly to a working robot having a high posture stability.

BACKGROUND ART

In the modern society, the importance of safety becomes more serious, and in the past, a human directly operates a machine for restoration work in rough terrains such as the fields of disaster and construction.

An overturn prevention method according to a related art is applicable only to specific equipment called an excavator. In addition, information such as postures and positions is obtained from an upper body of the excavator such as a boom, an arm and a bucket, which are working parts of the excavator, not from a machine driving part. However, there is a limitation in terms of responsiveness and intuition when it is implemented in an automatic manner.

DISCLOSURE

Technical Problem

The present invention relates to a working robot having a high posture stability.

The invention also relates to a working robot that is effectively controlled to have a stable posture.

In addition, the present invention relates to a working robot having a high responsiveness and intuition in the posture stabilization process.

Technical Solution

According to one embodiment of the present invention, there is provided a working robot including: a body; a plurality of traveling units connected to the body, having supporting members and traveling members rotatably connected to the supporting members, and provided so as to be travelable with respect to the ground; and a plurality of adjusting units connecting the body and the traveling units, and provided to enable the relative positions of the traveling units to the body to be adjusted, wherein the plurality of traveling units are traveled and the plurality of adjusting units are adjusted so as to maintain a horizontal state of the body.

The adjusting unit may adjust positions of the plurality of traveling units independently with respect to the body in up-down, front-rear, and left-right directions.

The adjusting unit may include: an upper connection member connected to the body to rotate in an up-down direction; an adjusting member provided in a form of an arm having a predetermined length, and having one end rotatably connected to the upper connection member; and a lower connection member rotatably connected to an opposite end of the adjusting member and having a traveling shaft to which the traveling unit is connected.

The adjusting unit may further include a first driving member having a variable length, in which one end of the first driving member is connected to the adjusting member, and an opposite end of the first driving member is connected to the body.

The adjusting member may include: a first adjusting member having a predetermined length, in which one end of the first adjusting member is rotatably connected to the upper connection member, and an opposite end of the first adjusting member is rotatably connected to the lower connection member; and a second adjusting member having a predetermined length, in which one end of the second adjusting member is rotatably connected to the upper connection member, an opposite end of the second adjusting member is rotatably connected to the lower connection member, and the second adjusting member is spaced apart from the first adjusting member by a predetermined distance.

The adjusting unit may further include a second driving member having a structure with a variable length, in which one end of the second driving member is connected to the first adjusting member, and an opposite end of the second driving member is connected to the second adjusting member.

The working robot may further include: a sensor configured to detect information about a state of the working robot; and a controller configured to drive the adjusting unit such that a relative position of the traveling unit with respect to the body is adjusted through information provided by the sensor.

The working robot may further include: a driving member configured to drive the traveling unit and the adjusting unit, wherein the sensor may include: a main sensor configured to detect a movement state of the body; and a driving sensor configured to detect an operating state of the driving member.

The sensor may further include a tilt sensor configured to detect a tilting angle of the traveling unit.

The controller may independently control relative positions of the plurality of traveling units with respect to the body so that a posture of the working robot corresponds to a posture command.

The controller, after recognizing a state of the working robot through the information provided by the sensor, may control a posture of the working robot by independently controlling relative positions of the plurality of traveling units with respect to the body, and the state recognition of the working robot and the posture control for the working robot may be repeatedly performed at least once in a closed loop structure.

The controller may perform the posture control through a closed loop inverse kinematics control (CLIK).

The controller may allow the traveling member to rotate by reflecting a relative speed change occurring between the plurality of traveling units when the relative position of the traveling unit with respect to the body is adjusted.

The controller may control an operation of the traveling member to compensate for a speed reduction of the traveling unit in a direction of a horizontal plane when the relative position of the traveling unit with respect to the body is adjusted in a state in which the traveling unit is tilted with respect to the horizontal plane.

The working robot may further include: a controller configured to control the plurality of traveling units and the plurality of adjusting units, wherein, when rotation occurs in left-right directions of the body, the controller recovers a horizontal state of the body by controlling the adjusting unit, which is located on a side where the body is tilted downward, to gather in a downward direction of the body, and controlling the adjusting unit, which is located on a side where the body is tilted upward, to escape out of the body, and the controller controls to cause a difference in a traveling speed between the traveling unit located on the side where the body is tilted downward and the traveling unit located on the side where the body is tilted upward.

The working robot may further include: a controller configured to control the plurality of traveling units and the plurality of adjusting units, wherein, when rotation occurs about an axis extending in front-rear directions of the body, the controller recovers a horizontal state of the body by: controlling the adjusting units such that a relative distance between the adjusting units located on a side where the body is tilted downward becomes closer and a relative distance between the adjusting units located on a side where the body is tilted upward becomes far away, controlling the traveling units such that a relative distance between the traveling units located on a side where the body tilted downward becomes closer, and controlling the adjusting unit such that a relative distance between the adjusting units located on a side where the body is tilted upward becomes far way.

Advantageous Effects

According to one embodiment of the present invention, a working robot having a high posture stability can be provided.

In addition, according to one embodiment of the present invention, a working robot which can be effectively controlled to have a stable posture can be provided.

Further, according to one embodiment of the present invention, a working robot having a high responsiveness and intuitiveness in the posture stabilization process can be provided.

DESCRIPTION OF DRAWINGS

FIG. 1 is a view showing a working robot according to one embodiment of the present invention.

FIG. 2 is an enlarged view of a traveling unit and an adjusting unit located on one side of the working robot.

FIG. 3 is a side view of a traveling unit and an adjusting unit of FIG. 2.

FIG. 4 is a plan view of a traveling unit and an adjusting unit of FIG. 2.

FIG. 5 is a longitudinal sectional perspective view of an adjusting unit taken along the longitudinal direction of the adjusting unit.

FIG. 6 is a view illustrating a control procedure of a working robot.

FIG. 7 is a flowchart illustrating a process of controlling a working robot.

FIGS. 8 and 9 are views showing an example in which the posture is adjusted in a tilted state of a working robot.

BEST MODE

Mode for Invention

Hereinafter, preferred embodiments of the present invention will be described in detail with reference to the accompanying drawings. The embodiments of the present invention can be modified in various forms, and the scope of the present invention should not be construed as being limited to the following embodiments. This embodiment is provided to more completely explain the present invention to those skilled in the art. Therefore, the shape of the elements in the drawings may be exaggerated to emphasize a more clear description.

FIG. 1 is a view showing a working robot according to one embodiment of the present invention.

In the following description in association with the configuration of a working robot 1, based on the position of the working robot 1 on a horizontal plane, one direction in which the working robot 1 can travel may be referred to as a front direction and a direction opposite to the front direction may be referred to as a rear direction, left-right directions perpendicular to the front-rear direction on the plane parallel to the ground may be referred to as a width direction, and a direction perpendicular to the front-rear directions and the width direction may be referred to as a height direction.

In addition, the direction directed forward from the rear direction may be referred to as a first direction X, the width direction may be referred to as a second direction Y, and the height direction may be referred to as the third direction Z.

Referring to FIG. 1, a working robot 1 according to an exemplary embodiment of the present invention may include a body 10, a traveling unit 20, and an adjusting unit 30.

The body 10 may provide a skeleton of the working robot 1. The body 10 may have a preset volume. The body 10 may be provided with additional components to assist the function of the working robot 1. For example, the body 10 may be provided with a configuration for an excavation work, a robot arm, a camera, and the like, so that the working robot 1 may perform the excavation work, a work for manipulating a workpiece using the robot arm, and a work for photographing a target space.

The traveling unit 20 may be connected to the body 10 and may travel on the ground, such that the working robot 1 may travel for position shift. A plurality of traveling units 20 may be provided. For example, the traveling unit 20 may be positioned at both sides of front and rear portions of the body 10, so that four traveling units 20 may be provided for the working robot 1. In this case, the traveling units 20 may be referred to as a left front traveling unit 20a, a right front traveling unit 20b, a left rear traveling unit 20c, and a right rear traveling unit 20d according to the position relative to the body 10.

FIG. 2 is an enlarged view of the traveling unit and the adjusting unit located on one side of the working robot.

Referring to FIG. 2, the traveling unit 20 may include a supporting member 210 and a traveling member 220.

The supporting member 210 may have a preset volume and can provide a skeleton of the traveling unit 20. The supporting member 210 may have a preset thickness in the width direction and a preset length in the front-rear direction.

The traveling member 220 is rotatably connected to the supporting member 210, so that the working robot 1 may travel in accordance with the rotation of the traveling member 220. For example, the traveling member 220 may be provided in the form of a wheel located around an outer portion of the supporting member 210.

The traveling member 220 may include a front traveling member 221, a rear traveling member 222, and a lower traveling member 223.

The front traveling member 221 may be provided at the front end of the supporting member 210. The front traveling member 221 may include a first front traveling member 221a and a second front traveling member 221b. The first front traveling member 221a may be positioned below the front end portion of the supporting member 210. The second front traveling member 221b may be positioned above the front end portion of the supporting member 210. The second front traveling member 221b may protrude in the front direction more than the first front traveling member 221a.

The rear traveling member 222 may be provided at a rear end of the supporting member 210. The rear traveling member 222 may include a first rear traveling member 222a and a second rear traveling member 222b. The first rear traveling member 222a may be located below a rear region of the supporting member 210. The second rear traveling member 222b may be positioned above the rear region of the supporting member 210. The first rear traveling member 222a may protrude in a rearward direction more than the second rear traveling member 222b.

The lower traveling member 223 may be provided at a lower outer side of the supporting member 210. A plurality of lower traveling members 223 may be provided in the front-rear directions.

In addition, if necessary, the traveling unit 20 may further include a caterpillar (not shown). The caterpillar may be provided around the outer portion of the supporting member 210 to make contact with the traveling member 220. Therefore, when the traveling member 220 is rotated, the caterpillar is rotated along the outer periphery of the supporting member 210, so that the working robot 1 may travel.

FIG. 3 is a side view of the traveling unit and the adjusting unit shown in FIG. 2, and FIG. 4 is a plan view of the traveling unit and the adjusting unit shown in FIG. 2.

Referring to FIGS. 3 and 4, the adjusting unit 30 connects the body 10 and the traveling unit 20. The adjusting unit 30 may include a left front adjusting unit 30a connected to the left front traveling unit 20a, a right front adjusting unit 30b connected to the right front traveling unit 20b, a left rear adjusting unit 30c connected to the left rear traveling unit 20c, and a right rear adjusting unit 30d connected to the right rear traveling 20d.

The adjusting unit 30 may adjust the relative position of the traveling unit 20 with respect to the body 10. The adjusting unit 30 may include an upper connection member 310, an adjusting member 320, a lower connection member 330, and driving members 341, 342, and 343.

The upper connection member 310 may be located at one end of the adjusting unit 30. One end of the upper connection member 310 may be rotatably connected to one side of the body 10. For example, the upper connection member 310 may be connected to the outer portion of the body 10 to rotate in the up-down direction about a shaft 311 provided in the left-right directions.

The adjusting member 320 may be provided in the form of an arm having a preset length. One end of the adjusting member 320 may be rotatably connected to the other end of the upper connection member 310. The adjusting member 320 may include a first adjusting member 321 and a second adjusting member 322.

The first adjusting member 321 may be provided in the form of an arm having a preset length. One end of the first adjusting member 321 may be connected to the inside of the other end of the upper connection member 310. The first adjusting member 321 may be rotatable in the horizontal direction with respect to the upper connection member 310 by a shaft 321a.

The second adjusting member 322 may be provided in the form of an arm having a preset length, and may be spaced apart from the first adjusting member 321 by a preset distance. One end of the second adjusting member 322 may be connected to an outer portion of the other end of the upper connection member 310. The second adjusting member 322 may be rotatable in the left-right directions with respect to the upper connection member 310 by a shaft 322a. The rotating shaft 322a of the second adjusting member 322 may be positioned parallel to a rotating shaft 321a of the first adjusting member 321 and spaced apart from rotating shaft 321a in the width direction by a preset distance.

The lower connection member 330 may be located at the other end of the adjusting unit 30. One side of the lower connection member 330 may be rotatably connected to the other end of the adjusting member 320. One side of the lower connection member 330 may be rotatably connected to the other end of the first adjusting member 321. One side of the lower connection member 330 may be rotatably connected to the other end of the second adjusting member 322. A rotating shaft 321b of the other end of the first adjusting member 321 may be provided in parallel with a rotating shaft 321a of one end of the first adjusting member 321. A rotating shaft 322b of the other end of the second adjusting member 322 may be provided in parallel with the rotating shaft 322a of the one end of the second adjusting member 322. The rotating shaft 321b of the other end of the first adjusting member 321 may be spaced apart from the rotating shaft 322b of the other end of the second adjusting member 322 in the width direction by a predetermined distance. The lower connection member 330 may be connected to the traveling unit 20 through a traveling shaft 331. The traveling shaft 331 may be located outside the lower connection member 330 and may extend outward by a preset length. The traveling unit 20 may be rotatable about the traveling shaft 331.

The driving members 341, 342, and 343 may provide power for driving the traveling unit 20 and the adjusting unit 30. The driving members 341, 342, and 343 may include a first driving member 341, a second driving member 342, and a third driving member 343.

The first driving member 341 may provide power for the adjusting member 320 such that the adjusting member 320 may rotate in the up-down direction (the Z-axis direction in FIG. 1) with respect to the body 10. The first driving member 341 may have a structure with a variable length, in which one end of the first driving member 341 may be connected to one end of the adjusting member 320, and the other end may be connected to the body 10. The first driving member 341 may have a cylinder structure driven by a fluid, in which one end is inserted into the other end so that the length is adjustable. One end of the first driving member 341 may be rotatably connected to the upper connection member 310, and the other end of the first driving member 341 may be rotatably connected to the body 10. One end of the first driving member 341 may be rotatable in the up-down direction with respect to the upper connection member 310 by a shaft 312, and the other end of the first driving member 341 may be rotatable in the up-down direction with respect to the body 10 by a shaft 341a. As the first driving member 341 is driven, the position of the traveling unit 20 in the up-down and front-rear directions with respect to the body 10 may be adjusted.

FIG. 5 is a longitudinal sectional perspective view of the adjusting unit taken along the longitudinal direction of the adjusting unit.

Referring to FIG. 5, the second driving member 342 may provide power to rotate the adjusting member 320 in the left-right directions (the Y-axis direction in FIG. 1).

The second driving member 342 may have a structure with a variable length, one end of which may be connected to the first adjusting member 321, and the other end of which may be connected to the second adjusting member 322. For example, the second driving member 342 may have a cylinder structure driven by a fluid, in which one end is inserted into the other end so that the length is adjustable. One end of the second driving member 342 may be rotatably connected to the first adjusting member 321, and the other end of the second driving member 342 may be rotatably connected to the second adjusting member 322. The rotating shafts 321a and 321b provided at both ends of the second driving member 342 may be in parallel with a shaft provided at an end of the adjusting member 320. For example, one end of the second driving member 342 may be connected to the rotating shaft 321a provided at one end of the first adjusting member 321. As the second driving member 342 is driven, the position of the traveling unit 20 in the left-right directions with respect to the body 10 may be adjusted.

The third driving member 343 may provide power to the traveling member 220. The third driving member 343 may be connected to at least one of the front traveling member 221, the rear traveling member 222, and the lower traveling member 223 to provide the power for rotation. For example, the third driving member 343 may include a motor that provides power to the traveling unit 20. For this purpose, the third driving member 343 may be provided at one side of the traveling unit 20. p FIG. 6 is a view illustrating a control procedure of the working robot.

Referring to FIG. 6, the working robot 1 may be provided with a controller 40. The controller 40 may control components of the working robot 1. The controller 40 may control the posture of the working robot 1 by using information provided by the sensors 51, 52, and 53.

The sensors 51, 52, and 53 may detect information about the state of the working robot 1 and provide the information to the controller 40. The sensors 51, 52, and 53 may include a main sensor 51, a driving sensor 52, and a tilt sensor 53.

The main sensor 51 may be configured to detect a movement state of the body 10. The main sensor 51 may be configured to detect at least one of the speed, direction, and acceleration of the body 10. For example, the main sensor 51 may be provided as an inertial measurement unit (IMU) to detect the speed, direction, gravity, and acceleration of the body 10, thereby detecting the yaw, roll and pitch of the body 10.

The driving sensor 52 may detect an operating state of the driving members 341, 342, and 343. The driving sensor 52 may include a first driving sensor 52a, a second driving sensor 52b, and a third driving sensor 52c.

The first driving sensor 52a may detect an operating state of the first driving member 341. For example, when the first driving member 341 is provided to be driven with a variable length, the first driving sensor 52a may be configured to detect the extension degree, the contraction degree, or the length of the first driving member 341. In addition, the first driving sensor 52a may be configured to detect a speed in length change of the first driving member 341. The first driving sensor 52a may be positioned on the adjusting unit 30 or the body 10 adjacent to the first driving member 341, or located inside the first driving member 341.

The second driving sensor 52b may detect an operating state of the second driving member 342. For example, when the second driving member 342 is provided to be driven with a variable length, the second driving sensor 52b may be configured to detect the extension degree, the contraction degree, or the length of the second driving member 342. In addition, the second driving sensor 52b may be configured to detect a speed in length change of the second driving member 342. The second drive sensor 52b may be located on the adjusting unit 30 adjacent to the second driving member 342.

The third driving sensor 52c may detect an operating state of the third driving member 343. For example, the third driving sensor 52c may be configured to detect an angular velocity of the traveling member 220 rotated by the third driving member 343 or an angular velocity of the traveling member 220 when the traveling member 220 is rotated. In addition, the third driving sensor 52c may be configured to detect an angular acceleration of the traveling member 220 rotated by the third driving member 343 or an angular acceleration of the traveling member 220 when the traveling member 220 is rotated. The third drive sensor 52c may be located on the traveling unit 20 or the adjusting unit 30 adjacent to the third driving member 343.

The tilt sensor 53 may detect a tilting angle of the traveling unit 20. The tilt sensor 53 may be located on the traveling unit 20 or on the adjusting unit 30 adjacent to the traveling shaft 331.

The working robot 1 may be configured to receive a command for controlling the operation from a manipulation unit 60. As an example, the working robot 1 may be configured to allow a user to ride the working robot 1, and the manipulation unit 60 may be configured to be located in the body 10. In addition, the manipulation unit 60 may be spaced apart from the body 10, and may be configured to transceive data in association with the controller 40 in a wireless or wired communication manner.

FIG. 7 is a flowchart illustrating a process for controlling the working robot.

Referring to FIG. 7, the controller 40 may control the working robot 1 based on information provided by the sensors 51, 52 and 53.

A command related to an operating state of the working robot 1 may be input through the manipulation unit 60 (S100). The command input through the manipulation unit 60 may include a posture command which is a command related to a posture of the working robot 1. For example, the posture command may include a command for making the body 10 of the working robot 1 in a horizontal state, and a command for allowing the body 10 of the working robot 1 to be tilted by a predetermined angle in a preset direction from the horizontal state. In addition, the posture command may include a command for moving the body 10 of the working robot 1 at a predetermined speed in a state in which the body 10 of the working robot 1 is arranged in a predetermined formation. Further, the posture command may include a command for allowing the body 10 to be spaced upward from the ground by a predetermined distance.

The command input through the manipulation unit 60 may include a work command that is a command for the contents of a work to be performed by the working robot 1. For example, the work command may include a command that allows the working robot 1 to perform photographing through a camera in a specific direction or a specific area while traveling or in a stop state, a command that allows a robot arm to perform a predetermined work while traveling or in a stop state, or a command to perform an excavation work in a stop state. In addition, the posture command may be included in the work command. For example, the controller 40 may store posture information of the working robot 1 corresponding to the predetermined work. In addition, when the work command is input, posture information corresponding to the work command may be executed as the posture command.

The controller 40 may determine the state of the working robot 1 through information provided by the sensors 51, 52, and 53 (S200). The controller 40 may determine whether the working robot 1 is moving or may determine the moving speed, the moving direction, and the acceleration when the working robot 1 is moving, based on the information provided by the main sensor 51. In addition, the controller 40 may determine whether the body 10 is tilted with respect to the horizontal plane, or may determine the tilting direction and the tilting angle when the body 10 is tilted with respect to the horizontal plane, based on the information provided by the main sensor 51. Further, the controller 40 may determine the height of the body 10 with respect to the ground based on the information provided by the sensors 51, 52, and 53. For example, the controller 40 may determine the height of the body 10 with respect to the ground by detecting the relative height of the traveling unit 20 with respect to the body 10 based on the information provided by the first driving sensor 52*a*. In addition, the controller 40 may further consider a vertical distance between the ground and the traveling shaft 331, which is spaced apart from the ground, based on the information provided by the tilt sensor 53.

The controller 40 may detect an angle defined between the adjusting unit 30 and the body 10 in the up-down direction (the Z-axis direction in FIG. 1) based on the information provided by the first driving sensor 52*a*. In addition, the controller 40 may detect the angular velocity, or the angular velocity and the angular acceleration of the adjusting unit 30 rotated in the up-down directions with respect to the body 10, based on the information provided by the first driving sensor 52*a*.

The controller 40 may detect an angle defined between the adjusting unit 30 and the body 10 in the left-right directions (Y-axis direction in FIG. 1), based on the information provided by the second driving sensor 52*b*. In addition, the controller 40 may detect the angular velocity, or the angular velocity and the angular acceleration of the adjusting unit 30 rotated in the left-right directions with respect to the body 10, based on the information provided by the second driving sensor 52*b*.

The controller 40 may detect a relative position of the traveling unit 20 with respect to the body 10 based on information provided by the first driving sensor 52*a* or the second driving sensor 52*b*. In addition, the controller 40 may detect the speed in change of the relative position of the traveling unit 20 with respect to the body 10 and the acceleration of the traveling unit 20 based on the information provided by the first driving sensor 52*a* or the second driving sensor 52*b*.

The controller 40 may detect a velocity of the traveling unit 20 traveling on the ground based on the information provided by the third driving sensor 52*c*. In addition, the controller 40 may detect the acceleration of the traveling unit 20 based on the information provided by the third driving sensor 52*c*.

The controller 40 may detect the tilting degree of the traveling unit 20 with respect to the horizontal plane based on information provided by the tilt sensor 53. In addition, the controller 40 may detect the velocity and acceleration of the traveling unit 20 in the horizontal plane direction based on the information provided by the third driving sensor 52*c* and the tilt sensor 53.

The controller 40 may detect a tilting angle of the traveling unit 20 with respect to the body 10 in the up-down directions based on the information provided by the tilt sensor 53 and the main sensor 51.

The controller 40 may detect a tilting angle of the traveling unit 20 with respect to the adjusting unit 30 in the up-down directions based on the information provided by the tilt sensor 53 and the first driving sensor 52*a*.

The controller 40 may independently adjust the relative position of each traveling unit 20 with respect to the body 10 through the driving members 341, 342, and 343, so that the posture of the working robot 1 may correspond to the posture command (S300). The controller 40 may control the first driving member 341 or the second driving member 342 to adjust the relative position of the traveling unit 20 with respect to the body 10, thereby controlling the posture of the body 10. As an example, the controller 40 may control the first driving member 341 or the first driving member 341 to move the traveling units 20 positioned on sides, in which the body 10 is tilted downward compared to the posture command, in the opposite direction such that the traveling units 20 face each other in front-rear or left-right directions. For example, when the body 10 is tilted in the rear direction compared to the posture command, the controller 40 may operate the first driving member 341 of the adjusting unit 30 connected to the traveling unit 20 such that the traveling units 20 located in the rear direction may move in the front direction. In addition, when the body 10 is tilted in the left direction compared to the posture command, the controller 40 may operate the second driving member 342 of the adjusting unit 30 connected to the traveling unit 20 such that the traveling units 20 positioned in the left direction may move in the right direction. Further, the controller 40 may operate the first driving member 341 such that the adjusting units 30 positioned before and after the left direction may be gathered in a direction where the adjusting units 30 face each other. In addition, the controller 40 may operate the first driving member 341 such that the adjusting units 30 positioned before and after the right direction may move in a direction where the adjusting units 30 are far away from each other.

In addition, when the body 10 is tilted to one side in the front-rear directions and the width direction, the controller 40 may control the first driving member 341 and the second driving member 342 such that the traveling units 20 located on sides where the body 10 is tilted may travel in the opposite direction. In this case, the controller 40 may primarily operate one of the first driving member 341 and the second driving member 342 and then operate the other one, or may operate the first driving member 341 and the second driving member 342 together.

In addition, the controller 40 may control the first driving member 341 or the second driving member 342 such that the traveling units 20 positioned on sides where the body 10 is tilted upward compared to the posture corresponding to the posture command may move in a direction in which the traveling units 20 are far from the opposite direction where the traveling units 20 face each other.

For example, when the body 10 is tilted in the rear direction compared to the posture corresponding to the posture command, the controller 40 may operate the first driving member 341 of the adjusting unit 30 connected to the traveling unit 20 such that the traveling unit 20 located in the front direction may move in the front direction. In addition, when the body 10 is tilted in the left direction compared to the posture corresponding to the posture command, the controller 40 may operate the second driving member 342 of the adjusting unit 30 connected to the traveling unit 20 such that the traveling unit 20 located in the right direction may move in the right direction. Further, when the body 10 is tilted to one side in the front-rear directions and the width direction, the controller 40 may control the first driving member 341 and the second driving member 342 such that the traveling units 20 located on sides tilted upward compared to the posture command may move in a direction where the traveling units 20 are far from the opposite direction. In this case, the controller 40 may primarily operate one of the first driving member 341 and the second driving member 342 and then operate the other, or may operate the first driving member 341 and the second driving member 342 together.

In addition, the controller 40 may move the traveling unit 20 located on a side where the body 10 is tilted downward compared to the posture command and the traveling unit 20 located on a side where the body 10 is tilted upward compared to the posture command through the above-described method. In this case, the controller 40 may primarily move one of the traveling unit 20 located on the side where the body 10 is tilted downward compared to the posture command and the traveling unit 20 located on the side where the body 10 is tilted upward compared to the posture command, and then move the other or may move the two traveling units together. Further, the controller 40 may select the traveling unit 20 whose relative position with respect to the body 10 is adjustable such that the body 10 may be spaced upward from the ground by a predetermined distance or more.

When the relative position of the traveling unit 20 with respect to the body 10 is adjusted by driving the adjusting unit 30, the controller 40 may reflect the change in the relative speed among the plurality of traveling units 20 for the operation of the third driving member 343.

When the adjusting unit 30 is driven to adjust the position of the traveling unit 20, the controller 40 may control the third driving member 343 to allow the traveling member 220 to move in the direction for the position adjustment.

When the traveling unit 20 moves to adjust the relative position of the traveling unit 20 with respect to the body 10, the relative speed of the traveling unit 20 whose position is adjusted with respect to the body 10 or another traveling unit 20 whose position is not adjusted may be changed. For example, when the position of one adjusting unit 30 is adjusted while the working robot 1 is stopped, only one adjusting unit 30 may move while the remaining three adjusting units 30 are stopped. In addition, when the position of one adjusting unit 30 is adjusted while the working robot 1 moves at a preset speed, the speed difference may occur between the remaining three adjusting units 30 and one adjusting unit 30 in which the speed and the position are adjusted. In this case, the controller 40 may operate the traveling member 220 such that the traveling unit 20 in which the position is adjusted may move while adjusting the speed difference between the traveling unit 20 in which the position is adjusted and the remaining traveling units 20. In this case, the controller 40 may obtain the speed difference based on information provided by the first driving sensor 52a, the second driving sensor 52b, or the third driving sensor 52c.

If the operating state of the traveling member 220 of the traveling unit 20 whose position is adjusted is the same as the operating state of the traveling member 220 of the remaining traveling units 20 whose positions are not adjusted, a force interfering with the position shift of the traveling unit 20 may be generated between the traveling unit 20 whose position is adjusted and the ground 20. This force may prevent the position adjustment of the traveling unit 20, thereby increasing the time required to adjust the position of the traveling unit 20. In this regard, the traveling unit 20 according to the present invention is configured to move in the direction for the position adjustment by the traveling member 220 while the position is adjusted by the adjusting unit 30. Accordingly, a force that interferes with the movement of the traveling unit 20 may not be generated between the traveling unit 20 and the ground, so that the position of the traveling unit 20 may be adjusted within a short period of time.

The controller 40 may reflect the tilting degree of the traveling unit 20 when adjusting the speed of the traveling unit 20. The ground on which the working robot 1 is located may be parallel to the horizontal plane or inclined with respect to the horizontal plane. When the traveling unit 20 moves on the ground parallel to the horizontal plane, the speed of the traveling unit 20 may become the speed in the direction parallel to the horizontal plane. Meanwhile, when the traveling unit 20 moves on the ground inclined with respect to the horizontal plane, the speed in the direction parallel to the horizontal plane may become lower than the speed of the traveling unit 20. Therefore, even if each traveling unit 20 has the same speed, when the inclination of the ground on which each traveling unit 20 is located is different, the speed of the traveling units 20 in the direction of the horizontal plane may differ from each other. In addition, when the working robot 1 moves at least one of the traveling units 20 with respect to the body 10 or the remaining traveling units 20 to adjust the posture, the speed of the traveling unit 20 in the direction of the horizontal plane may be lower than the speed of the traveling unit 20 in the direction of the inclined plane. Therefore, when the traveling unit 20 moves along the inclined plane in a tilted state so that a predetermined ratio is generated between the speed of the traveling unit 20 in the direction of the inclined plane and the speed of the traveling unit 20 in the direction of the horizontal plane, the controller 40 may control the operation of the traveling member 220 in order to compensate for the speed reduction of the traveling unit 20 in the direction of the horizontal plane.

The controller 40 may determine whether the posture of the working robot 1 is stabilized corresponding to the posture command (S400). The controller 40 may repeat the posture control of the working robot 1 at least once in a closed loop structure. For example, the controller 40 may adopt a closed loop inverse kinematics algorithm such as a closed loop inverse kinematics control (CLIK) and may recognize the state of the working robot based on information provided from the sensors 51, 52, and 53 to repeatedly control the posture of the working robot 1 corresponding to the posture command.

When the posture of the working robot 1 is stabilized corresponding to the posture command, the controller 40 may control the working robot 1 to perform predetermined operations (S500).

FIGS. 8 and 9 are views showing an example in which the posture is adjusted in a tilted state of the working robot.

FIG. 8 illustrates an example in which the body 10 is tilted rearward about the axis extending in the second direction (Y in FIG. 1) such that the body 10 is directed in the left-right directions. Referring to FIG. 8, the rear driving units 20c and 20d may be controlled to move forward so that the distance to the body 10 may become closer. For this purpose, the controller 40 may control the rear adjusting units 30c and 30d to rotate downward so that the rear traveling units 20c and 20d may move toward the body 10 based on the first direction X. In addition, the controller 40 may control the speed of the traveling member 220 located in the rear traveling units 20c and 20d in response to the change in the relative speed of the rear traveling units 20c and 20d relative to the body 10.

In addition, the front driving units 20a and 20b may be controlled to move forward so that the distance to the body 10 may become far away. For this purpose, the controller 40 may control the front adjusting units 30a and 30b to rotate upward, so that the front traveling units 20a and 20b may move away from the body 10 based on the first direction X. In addition, the controller 40 may control the speed of the traveling member 220 located in the front traveling units 20a and 20b in response to the change in the relative speed of the front traveling units 20a and 20b relative to the body 10.

In this case, the posture control of the working robot 1 may be implemented by adjusting the position of the rear driving units 20c and 20d with respect to the body 10, the position of the front driving units 20a and 20b with respect to the body 10 or the positions of the rear driving units 20c and 20d and the front driving units 20a and 20b with respect to the body 10.

When the posture control is implemented by adjusting the position of the rear traveling units 20c and 20d, the speed of the rear traveling units 20c and 20d may be controlled higher than the speed of the front traveling units 20a and 20b.

When the posture control is implemented by adjusting the position of the front traveling units 20a and 20b, the speed of the front traveling units 20a and 20b may be controlled higher than the speed of the rear traveling units 20c and 20d.

When the posture control is implemented by adjusting the positions of the rear traveling units 20c and 20d and the front traveling units 20a and 20b, the relative relationship between the speed of the front traveling units 20a and 20b and the speed of the rear traveling units 20c and 20d may vary depending on the rotational speed of the adjusting unit 30 with respect to the body. For example, if the rotational speed of the front adjusting units 30a and 30b are higher than the rotational speed of the rear adjusting units 30c and 30d, the speed of the front traveling units 20a and 20b may be controlled higher than the speed of the rear traveling units 20c and 20d. In addition, if the rotational speed of the rear adjusting unit 30c and 30d is higher than the rotational speed of the front adjusting unit 30a and 30b, the speed of the rear traveling unit 20c and 20d may be controlled higher than the speed of the front traveling unit 20a and 20b.

FIG. 9 shows an example in which the working robot 1 is tilted to the left.

FIG. 9 illustrates an example in which the body 10 is tilted to the left about the axis extending in the first direction (X in FIG. 1) such that the body 10 may face the front-rear directions.

Referring to FIG. 9, the left front traveling unit 20a and the left rear traveling unit 20c may be controlled to move in a direction where the left front traveling unit 20a and the left rear traveling unit 20c face each other such that the distance to the body 10 may become closer. For this purpose, the controller 40 may control the left front adjusting unit 30a and the left rear adjusting unit 30c to rotate downward, so that the left front traveling unit 20a and the left rear traveling unit 20c may move toward the body 10 about first direction X. In addition, the controller 40 may control the speed of the traveling member 220 positioned at the left front traveling unit 20a and the left rear traveling unit 20c corresponding to the change in the relative speed of the left front traveling unit 20a and the left rear traveling unit 20c with respect to the body 10.

Further, the right front traveling unit 20b and the right rear traveling unit 20d may be controlled to move in a direction where they are away from each other such that the distance to the body 10 may become far away. For this purpose, the controller 40 may control the right front adjusting unit 30b and the right rear adjusting unit 30d to rotate upward, so that the right front traveling unit 20b and the right rear traveling unit 20d may become far away from the body 10 about the first direction X. In addition, the controller 40 may control the speed of the traveling member 20 positioned at the right front traveling unit 20b and the right rear traveling unit 20d corresponding to the change in the relative speed between the right front traveling unit 20b and the right rear traveling unit 20d with respect to the body 10.

In this case, the posture control of the working robot 1 may be implemented by adjusting the positions of the left front traveling unit 20a and the left rear traveling unit 20c with respect to the body 10, the positions of the right front traveling unit 20b and the right rear traveling unit 20d with respect to the body 10, or the position of the traveling units 20, which are located on both sides about the second direction Y, with respect to the body 10.

If the working robot 1 is tilted in the left direction while traveling forward at a predetermined speed, the controller 40 may control the left front traveling unit 20a and the right rear traveling unit 20d such that the left front traveling unit 20a and the right rear traveling unit 20d may have the forward speed the same as the predetermined forward speed of the working robot 1 and may control the left rear traveling unit 20c and the right front traveling unit 20b such that the left rear traveling unit 20c and the right front traveling unit 20b may have the forward speed higher than the predetermined speed of the working robot 1.

The working robot 1 according to one embodiment of the present invention may include the sensors 51, 52, and 53 and the controller 40 for performing the posture control based on the information provided by the sensors 51, 52, and 53. In addition, the controller 40 may perform the posture adjustment of the working robot 1 by adjusting the position of each traveling unit 20 through the closed loop inverse kinematics algorithm. Accordingly, the working robot 1 may maintain a highly stable posture regardless of the ground state of the space in which the working robot 1 is located, so that the working robot 1 can effectively perform predetermined works even in a field such as a rough terrain. For example, the working robot 1 according to one embodiment of the present invention may be a special purpose device, which can be used for working in disasters sites such as earthquakes, tsunamis, and terrors, for working in atypical rough terrains such as construction sites for mining and civil engineering, and for working in unmanned exploration, and may perform the traveling and predetermined works with a stable posture without causing the problem such as the overturning of the working robot 1.

In addition, in the working robot 1 according to one embodiment of the present invention, a plurality of traveling units 20 are connected to the body 10, and the relative position of each traveling unit 20 can be independently adjusted with respect to the body 10, so that the posture of the working robot 1 can be stabilized and high responsiveness and intuition can be achieved in the posture stabilization process.

The foregoing detailed description illustrates the present invention. In addition, the foregoing description shows and describes exemplary embodiments of the present invention, and the present invention can be used in various other combinations, modifications, and environments. That is, changes or modifications can be made within the scope of the concept of the invention disclosed in this specification, the scope equivalent to the disclosures described above, and/or the skill or knowledge in the art. The described embodiments illustrate the best modes for implementing the technical concept of the present invention, and various modifications required in the specific fields and applications of the present invention are also possible. Thus, the detailed description of the invention is not intended to limit the invention to the disclosed embodiments. Also, the appended claims should be construed to include other embodiments.

The invention claimed is:

1. A working robot comprising:
   a body;
   a plurality of traveling units connected to the body, the traveling units having supporting members and traveling members rotatably connected to the supporting members, and provided so as to be travelable with respect to a ground;
   a plurality of adjusting units connecting the body and the traveling units, the adjusting units being provided to adjust relative positions of the traveling units to the body;
   a sensor configured to detect information about a state of the working robot; and
   a controller configured to drive the adjusting units such that a relative position of each of the traveling units with respect to the body is adjusted based on information provided by the sensor,
   wherein the plurality of adjusting units are adjusted so as to maintain a horizontal state of the body,
   wherein the controller is configured to allow the traveling members to rotate by reflecting a change in relative speed occurring between the plurality of traveling units when the relative position of the traveling units with respect to the body is adjusted, and
   wherein the controller is configured to control an operation of the traveling members to compensate for a speed reduction of the traveling units in a direction of a horizontal plane when the relative position of the traveling units with respect to the body is adjusted in a state in which the traveling units are tilted with respect to the horizontal plane.

2. The working robot of claim 1, wherein the adjusting units independently adjust positions of the plurality of traveling units with respect to the body in up-down, front-rear, and left-right directions, respectively.

3. The working robot of claim 1, wherein the controller independently controls relative positions of the plurality of traveling units with respect to the body so that a posture of the working robot corresponds to a posture command.

4. The working robot of claim 1,
   wherein, when rotation occurs about an axis extending in left-right directions of the body, the controller is configured to recover a horizontal state of the body by controlling the adjusting units, which is located on a downwardly tilted side of the body, and
   the controller is configured to cause a difference in a traveling speed between the traveling units located on the downwardly tilted side of the body and the traveling units located on the upwardly tilted side of the body.

5. The working robot of claim 1,
   wherein, when rotation occurs about an axis extending in front-rear directions of the body, the controller is configured to recover a horizontal state of the body by:
   controlling the adjusting units such that a relative distance between the adjusting units located on a downwardly tilted side of the body becomes closer, and
   controlling the traveling units such that a relative distance between the traveling units located on a downwardly tilted side of the body becomes closer.

6. The working robot of claim 1, further comprising:
   a driving member configured to drive each of the traveling units and each of the adjusting units,
   wherein the sensor includes:
   a main sensor configured to detect a movement state of the body; and
   a driving sensor configured to detect an operating state of the driving member.

7. The working robot of claim 6, wherein the sensor further includes a tilt sensor configured to detect a tilting angle of each of the traveling units.

8. The working robot of claim 1, wherein the controller, after recognizing a state of the working robot based on the information provided by the sensor, controls a posture of the working robot by independently controlling relative positions of the plurality of traveling units with respect to the body.

9. The working robot of claim 8, wherein the controller is configured to perform posture control through a closed loop inverse kinematics control (CLIK).

10. The working robot of claim 1, wherein each of the adjusting units includes:
    an upper connection member connected to the body to rotate about up-down directions;
    an adjusting member configured in a form of an arm having a predetermined length, and having one end rotatably connected to the upper connection member; and
    a lower connection member rotatably connected to an opposite end of the adjusting member and having a traveling shaft to which one of the traveling units is connected.

11. The working robot of claim 10, wherein each of the adjusting units further includes a first driving member having a variable length, and
    wherein one end of the first driving member is connected to the adjusting member, and an opposite end of the first driving member is connected to the body.

12. The working robot of claim 10, wherein the adjusting member includes:
    a first adjusting member having a predetermined length; and
    a second adjusting member having a predetermined length,
    wherein one end of the first adjusting member is rotatably connected to the upper connection member, and an opposite end of the first adjusting member is rotatably connected to the lower connection member, and
    wherein one end of the second adjusting member is rotatably connected to the upper connection member, an opposite end of the second adjusting member is rotatably connected to the lower connection member, and the second adjusting member is spaced apart from the first adjusting member by a predetermined distance.

13. The working robot of claim 12, wherein each of the adjusting units further includes a second driving member having a structure with a variable length, and
    wherein one end of the second driving member is connected to the first adjusting member, and an opposite end of the second driving member is connected to the second adjusting member.

* * * * *